Sept. 29, 1959

C. R. SIBLEY 2,906,853

ELECTRIC ARC CUTTING

Filed Dec. 6, 1957

INVENTOR.
CRAIG R. SIBLEY

BY H. Hume Mathews
Edmund W. Bopp

ATTORNEY & AGENT

Sept. 29, 1959  C. R. SIBLEY  2,906,853
ELECTRIC ARC CUTTING
Filed Dec. 6, 1957  2 Sheets-Sheet 2
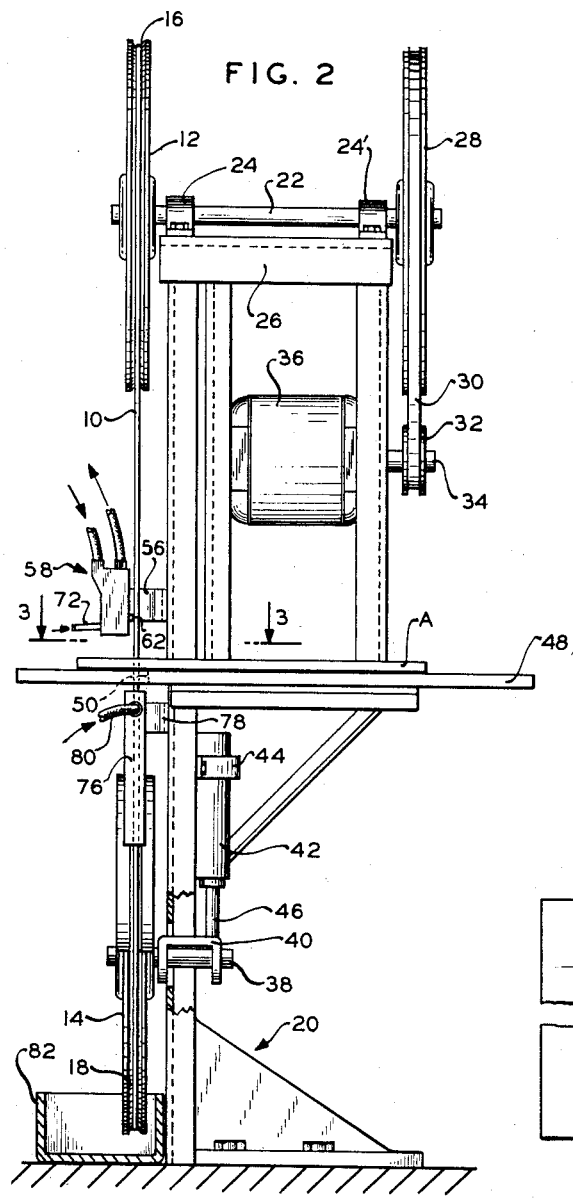
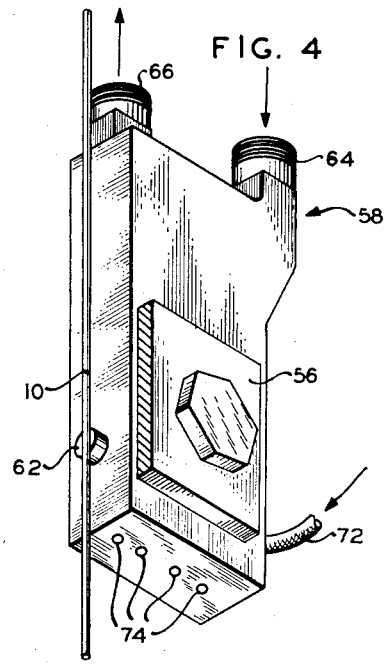
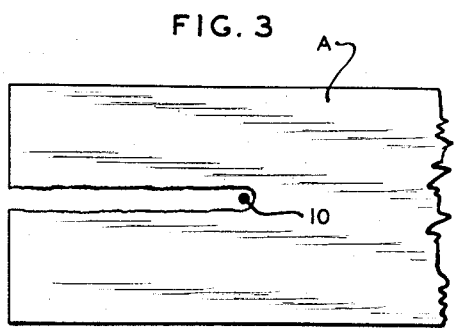
INVENTOR.
CRAIG R. SIBLEY
BY H. Hume Matthews
Edmund W. Bopp
ATTORNEY & AGENT

United States Patent Office 2,906,853
Patented Sept. 29, 1959

2,906,853

ELECTRIC ARC CUTTING

Craig R. Sibley, New Providence, N.J., assignor to Air Reduction Company, Incorporated, New York, N.Y., a corporation of New York Application December 6, 1957, Serial No. 701,056

5 Claims. (Cl. 219—69)

The invention relates to improvements in electric arc cutting by means of a continuous wire electrode.

A known method of electric arc cutting of metal objects involves continuously feeding a consumable wire electrode to a high current density electric arc provided between the wire electrode and the metal object to be cut. In this method, as more particularly described in British Patent No. 731,953, published June 15, 1955, the arc is maintained between the side of the wire and the leading edge of the cut. The wire is fed to the arc at a rate equal to the burn-off rate, or the rate that the wire is consumed at the arc. A stream of inert gas, such as argon, is provided to shield the arc and the molten metal formed thereby. This method enables shape cutting, as well as straight-line cutting of ferrous and non-ferrous metals, and has received wide commercial acceptance.

In practicing such consumable wire electrode method of electric arc cutting, the value of the current and the rate of wire feed must be carefully adjusted or correlated in order to obtain a steady arc voltage and a suitable cut. To increase cutting speed, it is necessary to increase the amount of current delivered to the arc and to proportionately increase the rate of feed and consumption of the wire electrode. Since the current values required by the process are high to begin with, as cutting speed is increased, the demand for current at the arc becomes extraordinarily great. For example, aluminum plate ½" thick requires 1300 amperes for a cutting speed of 70 inches per minute. At this current value, the wire electrode must be fed at a rate of 500 inches per minute in order to equal the burn-off rate, and thereby maintain equilibrium. With a harder metal, such as stainless steel, a current value of 1000 amperes is necessary to cut a plate ¼" thick at a rate of 50 inches per minute. At this high current value the wire must be fed to the arc at 400 inches per minute in order to afford a suitably correlated wire feed rate which will equal the rate of burn-off. Thus, it will be apparent that the extraordinarily high current requirements of the process necessitate the use of generators of unusually high capacity, and place an economically practical limit upon the process. Lower cutting speeds are used because of the inordinately high current values required at the higher rates of cutting. Moreover, the quantity of wire consumed constitutes a substantial item of expense.

An object of the invention therefore, is to provide a method of electric arc cutting by means of a continuously fed wire electrode wherein the wire is utilized to fullfill its function of maintaining the electric arc without, however, the wire being consumed, thereby saving the cost of the wire.

Another object of the invention is to provide a method of electric arc cutting by means of a continuously fed wire electrode wherein the current required to cut a given metal at a given speed is less than the current required with the described consumable wire method. As a corollary, the lower current requirement afforded by the method of the invention enables cutting at higher speeds within the practical limits of available current capacity.

These and other objects and advantages of the invention will be apparent from the following detailed description.

Whereas in electric arc cutting by means of a continuously fed wire electrode, it has hitherto been deemed necessary to feed the wire at the same rate that the wire is consumed at the kerf, in accordance with the invention, the wire is continuously fed to the arc at such high rate of movement that the wire travels through the arc, delivers the current necessary to sustain a steady arc voltage, and still maintains its continuity. Contrary to the established relationship between current and rate of wire feed in the consumable wire method of electric arc cutting, which necessitates a proportionate increase in wire feed rate when the current is increased, it has been found that not only may the wire electrode be fed through the arc at a rate to deliver the necessary current to sustain the arc without being consumed, but that if the rate of wire feed is sufficiently high, the current necessary to sustain the arc reaches a peak; thereafter, further increase in the rate of wire feed results in a decrease in the current required to provide a suitable cut. Such peak is substantially the same, or only slightly higher than the current value required when consuming the wire electrode.

Without being restricted to the theoretical explanation for this phenomenon of current fall-off it is believed that utilizing the wire electrode to conduct the current to the arc, and moving the wire through the arc so rapidly that it is not consumed or appreciably deteriorated, results in a reduction of the energy expended at the arc by an amount represented by the energy which would otherwise be expended to deteriorate or melt the wire. As will be evident from the test data hereinafter set forth, by feeding the wire at a sufficiently high rate, the current at the arc to provide a suitable cut through a given metal of given thickness at a given rate of cutting may be as low as 50% of the current required to cut such metal at the same rate by the consumable wire method of electric arc cutting.

The rate of wire feed at which the wire will pass through the arc without being consumed or appreciably deteriorated, and above which rate the current necessary to provide a suitable cut, in addition, begins to diminish as the rate of wire feed is increased, depends upon and varies with the particular metal that is cut at the arc; also, upon the composition of the wire electrode, the diameter of the wire, and in some measure upon the thickness of the metal being cut. Similarly, while not realizing the fullest advantages of the invention insofar as the important result of current diminution, the same factors or variables, that is, particular metal to be cut, wire electrode composition and diameter, and thickness of metal plate, determine the rapid, though lower, rate of wire feed which enable cutting without consuming the wire. The scrap value of the wire, at least, may be realized without imposing any appreciable increased load on the generator to obtain a rate of cutting substantially the same as when the wire is fed at a rate which results in its being melted or consumed. The rate of wire feed which is sufficiently high to effect continuity of the wire electrode, or additionally, to afford a decrease in the current required to furnish a suitable cut, may be ascertained for the particular metal by following the principles of the invention as here established; particularly, as these principles are exemplified by the results of the following tests with examples of a ferrous and non-ferrous metal.

Using a steel wire electrode of 3/32 inch diameter in the form of a closed loop or endless band in apparatus as hereinafter described, with an arc voltage of 25 volts, and an argon gas shield flow of 50 cubic feet per hour, the following current values are required to cut an aluminum plate, ½ inch thick, at a rate of 70 inches per minute at the rates of wire feed designated:

| Wire feed rate (in./min.): | Current (amps.) |
|---|---|
| 1,750 | 1,400 |
| 8,400 | 900 |
| 12,600 | 600 |

At a wire feed rate of 1750 inches and higher, the wire electrode band passes through the arc and maintains its continuity. As the rate of wire feed is increased, the current required decreases as indicated. To cut the same material at 70 inches per minute with the current correlated to wire feed so that the wire feed rate equals the rate of its burn-off requires 1300 amperes with a wire feed rate of 550 inches per minute. By feeding the wire electrode at 12,600 inches per minute, not only is the wire saved, but the current needed to cut is more than halved.

Similarly, stainless steel plate, ¼ inch thick, was cut at a rate of 50 inches per minute, with the same diameter wire in the electrode band, substantially the same arc voltage, and shielding gas flow as above indicated. The current values required at various rates of wire feed while preserving wire continuity are as follows:

| Wire feed rate (in./min.): | Current (amps.) |
|---|---|
| 1,750 | 1,100 |
| 6,360 | 780 |
| 8,400 | 660 |

Cutting the same material at 50 inches per minute by a consumable wire method requires 1000 amperes with a wire feed rate of 400 inches per minute. As indicated, increasing the speed of wire feed materially reduces the current required to cut.

It has been determined that the method operates most satisfactorily when the arc voltage is not allowed to exceed 28 volts. Also, employing D.C. straight polarity seems to better preserve the continuity of the wire electrode than when reverse polarity is used.

The apparatus described in the aforesaid British patent, or the gun arrangement shown in the Muller et al. Patent No. 2,504,868, granted April 18, 1950, may be used to practice the method of the invention. The continuous wire electrode, however, is fed at the greatly increased rates to preserve wire continuity, or additionally, to provide the lower current values. Cooling means and a reel for winding turns of the wire thereon may be provided at the exit end of the arc after the wire has served to conduct the current to the arc and cut the metal object. If desired, the rapidly moving wire may be loosely collected in a container, thereby making the wire available as scrap, or for some use which does not require the wire to be entirely free of kinks. It is preferred, however, to provide the wire electrode in the form of a closed loop or band, which is continuously fed to the arc and recycled. Apparatus which has been found to be particularly suitable for realizing the advantages of the invention is illustrated in the accompanying drawings in which:

Fig. 2 is a front elevation of the apparatus shown in Fig. 1;

Fig. 3 is a top plan view of the metal object as it is being cut, this view being taken approximately in the plane of line 3—3 of Fig. 2; and Fig. 4 is an enlarged perspective view of a contact shoe suitable for engaging a stretch of the traveling, closed band wire electrode.

Figure 1:
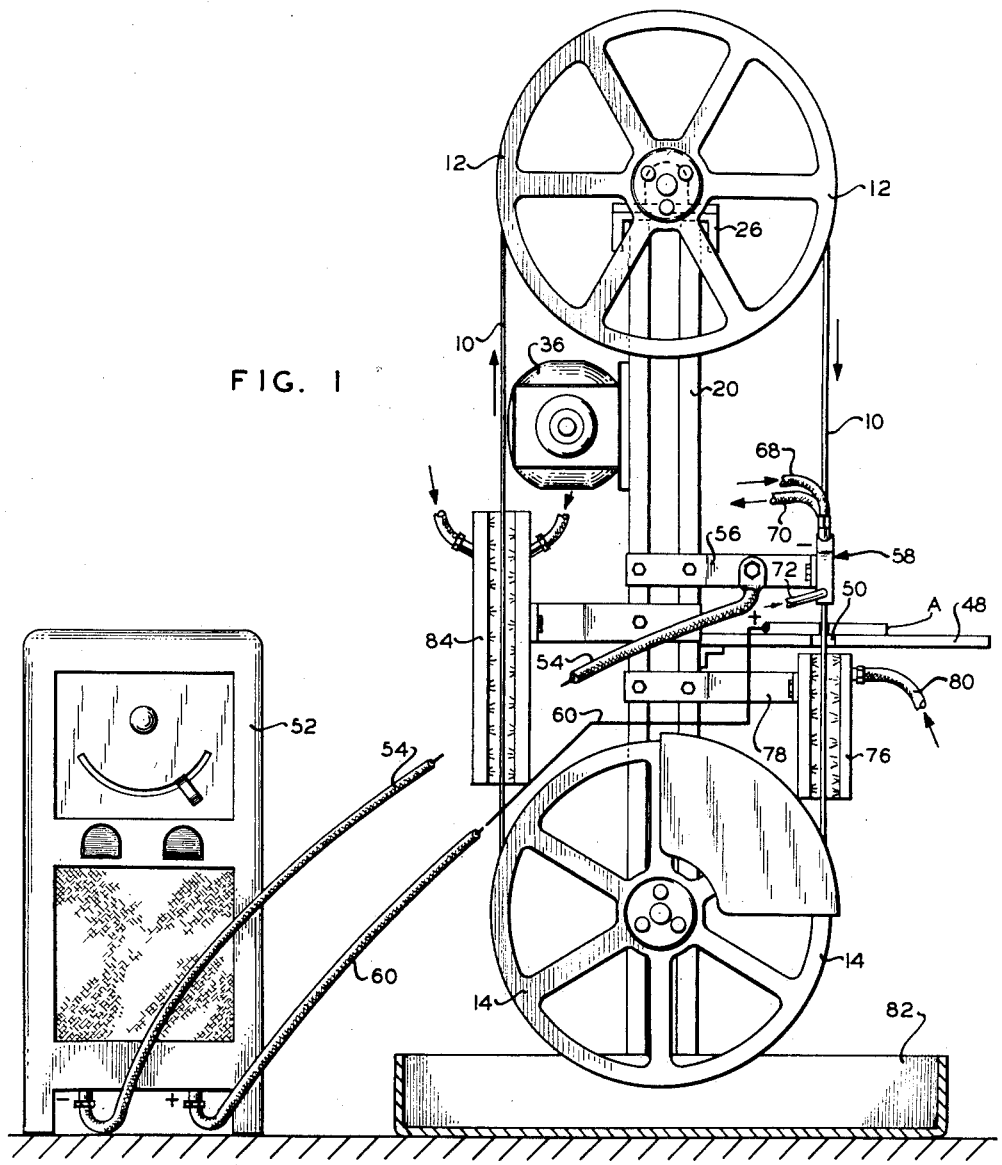
Fig. 1 is a side elevation of apparatus providing a wire electrode in the form of a closed band, the band being continuously fed and recycled to provide an electric arc to cut a metal object.

Referring to the drawings for a detailed description of this perferred means for practicing the method of the invention, a wire electrode of any suitable diameter, such as 3/32 inch steel wire, is made in the form of a closed or endless loop or band 10. The wire band is disposed around a pair of spaced sheaves 12 and 14 having grooves 16 and 18, respectively, formed in their peripheries to guide the band. The sheaves are mounted for rotation on a structural frame 20. Both of the sheaves may be positively driven, if desired; however, it is preferred to positively drive one of the sheaves and make the other sheave an idler or follower which is driven by the wire band itself.

As shown in Fig. 2, the sheave 12 is secured to one end of a horizontally extending drive shaft 22, journaled in spaced bearings 24, 24', which are bolted to a plate 26 provided at the top of the frame. The opposite end of the drive shaft has a pulley 28 mounted thereon, the pulley being rotated by a belt 30 around a second pulley 32 which is secured to the shaft 34 of a motor 36. The motor is secured to the frame 20. The sheave 14 has its shaft 38 journaled in a bearing 40 mounted on the frame. The sheave 14 is rotated by the frictional engagement therewith of the wire band which has movement imparted thereto by the driving sheave 12.

It is preferred to apply resilient tension upon the wire band electrode, and for this purpose an air cylinder 42 is supported on the frame by a bracket 44, as shown in Fig. 2. The piston 46 of the cylinder is located to engage the shaft 38 of the idler sheave to maintain resilient tension upon the band in its transit around the sheaves.

The apparatus is provided with a work table 48 to support a work piece A thereon for cutting. The work table is provided with a slot 50 to allow the wire band to travel therethrough. If desired, a motorized carriage may be provided to support a workpiece, with the carriage mounted to run on a track provided on the work table adjacent a stretch of the wire band in the vicinity where the electric arc is to be provided.

As shown in Fig. 1, the current is brought to the wire band electrode 10 by a D.C. generator 52. One cable 54 is connected to a conductor bar 56 which is fastened to the frame 20. An electrode contact device or shoe, generally designated 58, is secured to the opposite end of the conductor bar. The second generator cable 60 is connected to the workpiece A. It has been found that in using wire electrode cutting bands of steel wire that they last longer when D.C. straight polarity is employed, i.e., the electrode wire is made negative with respect to the workpiece being cut. However, the invention also contemplates the use of D.C. reverse polarity as well as A.C.

Contact shoe 58 may be formed in any suitable manner to furnish proper engagement with the moving electrode band. The contact shoe is located to bear against the stretch of the band adjacent the arc or just prior to the band's entry into the arc. The wire band electrode may be kept sufficiently taut in its travel around the sheaves by means of the described air cylinder and idler sheave arrangement so that additional guides are unnecessary. As more particularly shown in Fig. 4, the contact shoe may be formed with a wire engaging button or contact member 62 formed of a conductive, wear-resistant material, such as tungsten. The contact shoe is made hollow to allow a coolant, such as water, to be circulated therein. Threaded connectors 64 and 66 are provided on the shoe to receive inlet and outlet hoses 68 and 70, respectively, to conduct the coolant into and out of the shoe.

The electric arc which is provided between the extremely fast moving wire band electrode and the workpiece may be shielded with a suitable shielding medium, such as argon, although the very nature of the process permits the metal object to be cut without necessitating a gas shield. If it is desired to use a shielding gas, as shown in Fig. 4, the gas may be supplied through a hose 72 which conducts the gas into the shoe. A series of suitably angled apertures 74 direct the shielding gas stream about the arc.

The rapidly moving wire electrode band absorbs heat as it passes through the electric arc provided between the band and the workpiece. In order that the band shall not unduly elongate as the wire is rapidly and continuously recycled through the arc, means is provided to cool the band. A device 76 for spraying a coolant, such as water, onto the band is provided immediately below the arc and above the sheave 14. The device is secured to the frame 20 by a bracket 78, the coolant being supplied through a hose 80, as shown in Fig. 1. A pan 82 is located beneath the sheave 14 and the spraying device to catch the run-off of the coolant. A second cooling device 84 may be provided to further cool the band after a stretch thereof passes around the sheave 14. The pan 82 will also catch the coolant from this spray device.

In accordance with the present invention, cutting proceeds without actual physical contact of the electrode wire and the workpiece. The energy of the arc coupled with the arc forces melts metal from the workpiece and forceably projects it from the kerf. An interesting and unanticipated phenomenon is the fact that the direction in which the molten metal is projected from the kerf as the cut progresses is independent of the arc polarity and the direction of motion of the wire. The molten metal is projected from the kerf on the side of the workpiece opposite the side on which the arc current is introduced into the electrode. For example, if in apparatus of the type heretofore described, the arc current is introduced into the electrode wire at a point above the workpiece, as illustrated in the drawings, the molten metal will be projected from the bottom of the kerf in the workpiece regardless of the polarity of current employed and regardless of whether the wire moves down through the kerf or up. Conversely, if the current is introduced into the wire below the workpiece, the cut material will be projected from the top of the kerf regardless of the direction of rotation of the wire or the polarity of the current employed. Gravity has little or no effect on this process other than the obvious one that if the device is operated so that the molten metal is projected out of the top of the kerf, it will of course, fall back on to the plate. For this reason, it is obviously preferred to arrange the introduction of the current into the wire in such a manner that the projected molten metal from the kerf will fall free of the workpiece.

It is believed that the advantages of the improved method of electric arc cutting will be apparent from the foregoing detailed description. Ferrous and non-ferrous objects may be shape cut at rates of a magnitude hitherto considered beyond the possibilities of electric arc cutting by means of a continuously fed wire electrode. Also, there is the added advantage of preserving the continuity of the wire electrode and thereby saving its value. While the invention has been described in its preferred form, it will be understood that numerous modifications may be made without departing from the spirit and scope of the invention, as sought to be defined in the following claims.

I claim:

1. In the art of cutting a metal object wherein a wire electrode is continuously fed to an electric arc established by a source of current between the wire electrode and the metal object, the improvement comprising feeding the wire through the arc at such high rate that the wire delivers the current necessary to sustain the arc and still maintains its continuity despite passage through the arc, the rate of wire movement being such that further increase thereof for a predetermined cutting rate provides a decrease in the current required at the arc.

2. In the art of cutting a metal object wherein a wire electrode is continuously fed to an electric arc established by a source of direct current between the wire electrode and the metal object, the improvement comprising feeding the wire through the arc at such high rate that the wire delivers the current necessary to sustain the arc and still maintains its continuity despite passage through the arc, the rate of wire movement being such that further increase in the rate thereof for a predetermined cutting rate provides a decrease in the current required at the arc, the connection of said source of current with the metal object and the wire electrode being at straight polarity, and the arc voltage being not more than 28 volts.

3. In the art of cutting a metal object wherein a wire electrode is continuously fed to an electric arc established by a source of current between the wire electrode and metal object, the improvement comprising providing the wire electrode in the form of a closed band, feeding the wire band through the arc at such high rate that the continuity of the band is maintained despite passage through the arc, the rate of movement of the band being such that further increase in the rate thereof for a predetermined cutting rate provides a decrease in the current required at the arc.

4. In the art of cutting a metal object wherein a wire electrode is continuously fed to an electric arc established by a source of current between the wire electrode and metal object, the improvement comprising providing the wire electrode in the form of a closed band, feeding the wire band through the arc at such high rate that the continuity of the band is maintained despite passage through the arc, and cooling the band prior to recycling through the arc, the rate of movement of the band being such that further increase in the rate thereof for a predetermined cutting rate provides a decrease in the current required at the arc.

5. In the art of cutting a metal object wherein a wire electrode is continuously fed to an electric arc established by a source of direct current between the wire electrode and metal object, the improvement comprising providing the wire electrode in the form of a closed band, feeding the wire band through the arc at such high rate that the continuity of the band is maintained despite passage through the arc, and cooling the band prior to recycling through the arc, the rate of movement of the band being such that further increase in the rate thereof for a predetermined cutting rate provides a decrease in the current required at the arc, the connection of said source of current with the metal object and the band being at straight polarity, and the arc voltage being not more than 28 volts.

References Cited in the file of this patent

UNITED STATES PATENTS

| | | |
|---|---|---|
| 2,526,423 | Rudorff | Oct. 17, 1950 |
| 2,794,110 | Griffith | May 28, 1957 |

FOREIGN PATENTS

| | | |
|---|---|---|
| 345,941 | Great Britain | Mar. 24, 1931 |
| 731,953 | Great Britain | June 15, 1955 |